(12) United States Patent
Isomura (10) Patent No.: US 10,819,131 B2
(45) Date of Patent: Oct. 27, 2020

(54) REGENERATION METHOD OF NICKEL-HYDROGEN BATTERY

(71) Applicant: TOYOTA JIDOSHA KABUSHIKI KAISHA, Toyota-shi, Aichi (JP)

(72) Inventor: Keisuke Isomura, Kariya (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 148 days.

(21) Appl. No.: 15/663,926

(22) Filed: Jul. 31, 2017

(65) Prior Publication Data

US 2018/0034300 A1 Feb. 1, 2018

(30) Foreign Application Priority Data

Aug. 1, 2016 (JP) ................................. 2016-151611

(51) Int. Cl.
*H02J 7/00* (2006.01)
*H01M 10/42* (2006.01)
*H01M 4/48* (2010.01)
*H01M 10/613* (2014.01)
*H01M 10/6563* (2014.01)
(Continued)

(52) U.S. Cl.
CPC ........... *H02J 7/0068* (2013.01); *H01M 4/383* (2013.01); *H01M 4/48* (2013.01); *H01M 4/52* (2013.01); *H01M 10/345* (2013.01); *H01M 10/4242* (2013.01); *H01M 10/44* (2013.01); *H01M 10/613* (2015.04); *H01M 10/6563* (2015.04); *H02J 7/007* (2013.01); *H01M 2300/0014* (2013.01); *Y02E 60/124* (2013.01)

(58) Field of Classification Search
CPC ...... H02J 7/0068; H02J 7/007; H01M 10/613; H01M 10/6563; H01M 4/383; H01M 4/48; H01M 4/52; H01M 10/345; H01M 10/4242; H01M 10/44; H01M 2300/0014; G01R 31/382; Y02E 60/124
See application file for complete search history.

(56) References Cited

U.S. PATENT DOCUMENTS 5,777,453 A 7/1998 Imanaga
6,730,428 B1 5/2004 Kondo et al.
(Continued)

FOREIGN PATENT DOCUMENTS

CN 1549386 A 11/2004
CN 1791804 A 6/2006
(Continued)

OTHER PUBLICATIONS

English machine translation of Kudo et al. (JP 2536257 B2) (Year: 1996).*

(Continued)

*Primary Examiner* — Stewart A Fraser
(74) *Attorney, Agent, or Firm* — Sughrue Mion, PLLC (57) ABSTRACT

Disclosed herein is a regeneration method of a nickel-hydrogen battery provided with a positive electrode at least including nickel hydroxide. In the regeneration method, a regeneration process of charging a nickel-hydrogen battery is performed by supplying a square-wave pulse current set to a repetition frequency ranging from 5 kHz to 10 kHz and to an average value of current $I_{AVE}$ ranging from 1 A to 10 A.

5 Claims, 5 Drawing Sheets (51) Int. Cl.
H01M 4/38 (2006.01)
H01M 4/52 (2010.01)
H01M 10/34 (2006.01)
H01M 10/44 (2006.01)

(56) References Cited

U.S. PATENT DOCUMENTS

| | | | |
|---|---|---|---|
| 9,685,810 B1* | 6/2017 | Bhardwaj | H02J 7/0093 |
| 2001/0028238 A1 | 10/2001 | Nakamura et al. | |
| 2004/0075417 A1* | 4/2004 | Aradachi | H02J 7/022 |
| | | | 320/107 |
| 2006/0186890 A1 | 8/2006 | Iwane et al. | |
| 2010/0280776 A1 | 11/2010 | Hayakawa et al. | |
| 2011/0025275 A1 | 2/2011 | Nozu et al. | |
| 2015/0207341 A1 | 7/2015 | Kagami | |
| 2016/0020495 A1 | 1/2016 | Koba et al. | |
| 2018/0041063 A1 | 2/2018 | Isomura | |

FOREIGN PATENT DOCUMENTS

| | | | |
|---|---|---|---|
| CN | 203119056 U | 8/2013 | |
| CN | 104919643 A | 9/2015 | |
| JP | 05-022871 A | 1/1993 | |
| JP | 2536257 B2 * | 9/1996 | |
| JP | 09-093824 A | 4/1997 | |
| JP | 10-304590 A | 11/1998 | |
| JP | 2000040537 A | 2/2000 | |
| JP | 2000299137 A | 10/2000 | |
| JP | 2003520554 A | 7/2003 | |
| JP | 2003235174 A | 8/2003 | |
| JP | 3605733 B2 * | 12/2004 | |
| JP | 2005-327737 A | 11/2005 | |
| JP | 2006032065 A | 2/2006 | |
| JP | 2007080552 A | 3/2007 | |
| JP | 2007-213843 A | 8/2007 | |
| JP | 2008071491 A | 3/2008 | |
| JP | 2009-048870 A | 3/2009 | |
| JP | 2009-159762 A | 7/2009 | |
| JP | 4427089 B1 | 3/2010 | |
| JP | 2011-008963 A | 1/2011 | |
| JP | 4749095 B2 | 8/2011 | |
| JP | 2012-059517 A | 3/2012 | |
| JP | 2014207151 A | 10/2014 | |
| JP | 2015215976 A | 12/2015 | |
| WO | WO-9926303 A1 * | 5/1999 | H01M 4/32 |

OTHER PUBLICATIONS

Becker, Maria Daniela, Guillermo Norberto Garaventta, and Arnaldo Visintin. "Pulse-Current Electrodeposition for Loading Active Material on Nickel Electrodes for Rechargeable Batteries." ISRN Electrochemistry 2013 (2013). (Year: 2013).*

English machine translation of Yamashita (JP 3605733 B2) (Year: 2004).*

Communication dated Oct. 11, 2018 issued by the United States Patent and Trademark Office (USPTO) in U.S. Appl. No. 15/669,130.

Communication dated May 2, 2019, from the United States Patent and Trademark Office in U.S. Appl. No. 15/669,130.

* cited by examiner

REGENERATION METHOD OF NICKEL-HYDROGEN BATTERY

CROSS-REFERENCE

The present application claims priority on the basis of Japanese Patent Application No. 2016-151611 filed in Japan on Aug. 1, 2016, the entire contents of which are incorporated herein by reference.

BACKGROUND OF THE INVENTION

1. Field of the Invention

The present invention relates to a regeneration method of a nickel-hydrogen battery provided with a positive electrode including nickel hydroxide.

2. Description of the Related Art

As witnessed in the recent proliferation of mobile devices, the increasing popularity of hybrid vehicles against the background of environmental and energy issues, and the development of electrical vehicles and large stationary batteries for storing surplus power, the role played by batteries and, particularly, secondary batteries, and expectations therefor are ever increasing. In particular, nickel-hydrogen batteries which are a type of secondary batteries use a nonflammable aqueous electrolyte and, even when relatively rapidly charged by a constant current, charging is automatically replaced by electrolysis of water contained in the electrolyte when fully charged to suppress further voltage rise. Accordingly, the importance of nickel-hydrogen batteries is increasing as batteries which are relatively safe and which enable charging to be readily controlled. Japanese Patent Application Publication No. H9-93824 is an example of technical literature related to a charging method of a nickel-hydrogen battery.

A nickel-hydrogen battery uses nickel hydroxide in a positive electrode, a hydrogen occlusion alloy in a negative electrode, and an alkaline electrolyte as an electrolyte. At the negative electrode, as shown in expressions (1) and (2) below, electrochemical reduction of hydrogen in water molecules and occlusion of hydrogen into the hydrogen occlusion alloy occur during charging and, conversely, electrochemical oxidation of stored hydrogen occurs during discharging.

[Charging]$H_2O + e^- \rightarrow H(occlusion) + OH^-$ (1)

[Discharging]$H(occlusion) + OH^- \rightarrow H_2O + e^-$ (2)

As the hydrogen occlusion alloy, an alloy based on rare earth and nickel is mainly used.

At the positive electrode, as shown in expressions (3) and (4) below, an electrochemical redox reaction of nickel hydroxide and nickel oxyhydroxide occurs.

[Charging]$Ni(OH)_2 + OH^- \rightarrow NiOOH + H_2O + e^-$ (3)

[Discharging]$NiOOH + H_2O + e^- \rightarrow Ni(OH)_2 + OH^-$ (4)

SUMMARY OF THE INVENTION

According to findings of the present inventors, in nickel-hydrogen batteries of this type, a crystalline structure of nickel hydroxide included in the positive electrode may collapse and become deactivated due to repetitive charging and discharging and long-term disuse. When nickel hydroxide is deactivated, the electrode becomes inactive and the electrochemical redox reaction described above is less likely to occur. As a result, a phenomenon of a decline in discharge capacity (chargeable and dischargeable capacity) may occur.

The present invention has been made in consideration of such cases and an object thereof is to provide a regeneration method of a nickel-hydrogen battery which enables battery performance having been degraded due to repetitive charging and discharging and long-term disuse to be appropriately recovered.

The regeneration method provided by the present invention is a regeneration method of a nickel-hydrogen battery provided with a positive electrode at least including nickel hydroxide. A feature of this regeneration method is that a regeneration process of charging a nickel-hydrogen battery is performed by supplying a square-wave pulse current set to a repetition frequency ranging from 5 kHz to 10 kHz and to an average value of current ranging from 1 A to 10 A. According to this configuration, battery performance having been degraded due to repetitive charging and discharging and long-term disuse can be appropriately recovered and the life of a nickel-hydrogen battery can be extended.

In a preferable aspect of the regeneration method disclosed herein, in the regeneration process, after discharging the nickel-hydrogen battery until an SOC drops to 50% or lower, the pulse current is supplied to charge the nickel-hydrogen battery until the SOC rises to 90% or higher. By charging from a deep discharged state with an SOC of 50% or lower to a state near fully charged with an SOC of 90% or higher in this manner, the regeneration effect described above may be better exhibited.

In a preferable aspect of the regeneration method disclosed herein, in the regeneration process, a charging-discharging cycle of discharging the nickel-hydrogen battery until an SOC drops to 50% or lower and subsequently supplying the pulse current to charge the nickel-hydrogen battery until the SOC rises to 90% or higher is repeated at least twice. Such a repeatedly-performed pulse charging process enables degraded battery performance to be more reliably recovered.

In a preferable aspect of the regeneration method disclosed herein, the regeneration process is performed while cooling the nickel-hydrogen battery with a cooling mechanism. Accordingly, battery performance can be recovered more efficiently by suppressing energy loss due to generation of heat by the battery.

In a preferable aspect of the regeneration method disclosed herein, before performing the regeneration process, a determination process is performed in which an impedance of a nickel-hydrogen battery that is a processing object is measured at a prescribed frequency and, by comparing an inductance value of the measured impedance with a threshold A set in advance, whether or not the nickel-hydrogen battery is regenerable is determined. Accordingly, excessively degraded batteries which cannot be recovered by the regeneration process can be eliminated in advance and the cost incurred by a subsequent regeneration process and the like can be reduced.

DETAILED DESCRIPTION OF THE INVENTION

Hereinafter, embodiments according to the present invention will be described with reference to the drawings. In the following drawings, members and portions that produce same effects will be described using same reference characters. It should be noted that dimensional relationships (length, width, thickness, and the like) shown in the respective drawings do not reflect actual dimensional relationships. In addition, any matters not specifically mentioned in the present specification but necessary for the implementation of the present invention (for example, a configuration and a method of producing an electrode body including a positive electrode and a negative electrode, a configuration and a method of producing a separator or an electrolyte, general techniques related to the construction of a nickel-hydrogen battery and other batteries, and the like) can be construed as design items for a person skilled in the art on the basis of prior art in the relevant field.

Moreover, in the present specification, a "pulse current" refers to a square-wave direct current in which ON and OFF (zero) are alternately repeated and an "average value of current" refers to a current value per unit time of a square-wave pulse current. In addition, an "SOC" refers to a depth of charge (state of charge) and indicates a state of charge in a range of operating voltage capable of reversible charging and discharging when a state of charge at which an upper limit voltage is obtained (in other words, a fully charged state) is assumed to be 100% and a state of charge at which a lower limit voltage is obtained (in other words, an uncharged state) is assumed to be 0%. For example, an SOC can be acquired from inter-terminal voltage of a battery. Furthermore, a "discharge capacity" refers to a capacity which can be reversibly charged and discharged within an SOC range of 0% to 100%.

(First Embodiment)

Hereinafter, a regeneration method of a nickel-hydrogen battery according to an embodiment of the present invention will be described in an order of a configuration of a nickel-hydrogen battery that is an object and a regeneration method.

<Nickel-hydrogen Battery>

Figure 1:
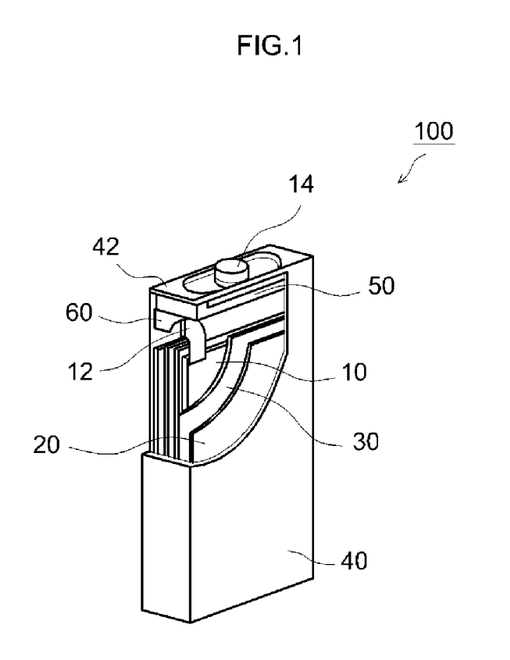
FIG. 1 is a partially-broken perspective view schematically showing an embodiment of a nickel-hydrogen battery.

A nickel-hydrogen battery 100 (hereinafter, referred to as a "battery" when appropriate) that is an object of the regeneration method according to the present embodiment is provided with, for example, a case 40 including a lid 42 as shown in FIG. 1. The case 40 houses therein a positive electrode 10, a negative electrode 20, and a separator 30 which constitute an electrode body of the nickel-hydrogen battery 100 according to the present embodiment.

The positive electrode 10 is constituted by a plurality of thin plate-shaped (sheet-shaped) electrode structures which are electrically connected to a positive electrode terminal 14 via a positive electrode collector tab 12. Meanwhile, the negative electrode 20 is constituted by a plurality of thin plate-shaped (sheet-shaped) electrode structures which are electrically connected to a negative electrode terminal (not shown) provided on a bottom surface of the case 40 via a negative electrode collector member (not shown). In addition, a spacer 60 and a gasket 50 provided in a periphery thereof are mounted to the case 40 on an inner side of the lid 42 to keep the interior of the case 40 in a sealed state.

Moreover, while a gas release vent structure for releasing internal gas to the outside of the case when gas pressure inside the battery 100 (inside the case 40) abnormally rises is formed on the spacer 60, since a structure similar to those attached to conventional nickel-hydrogen batteries may suffice and the structure does not characterize the present invention, a further detailed description thereof will be omitted.

The positive electrode 10 includes a positive electrode current collector and a positive electrode active material layer formed on both surfaces of the positive electrode current collector. The positive electrode current collector has a foil shape. The positive electrode current collector is preferably a nickel foil. The positive electrode active material layer includes nickel hydroxide as a positive electrode active material. Nickel hydroxide is converted into nickel oxyhydroxide in a battery reaction during charging. In addition, nickel oxyhydroxide is converted into nickel hydroxide in a battery reaction during discharging. The nickel hydroxide may be hydrated. Furthermore, for the purpose of improving characteristics of the positive electrode active material or the like, a part of the nickel element of nickel hydroxide may be replaced by another metallic element (for example, cobalt, aluminum, zinc, manganese, tungsten, titanium, niobium, ruthenium, and gold).

Figure 2:
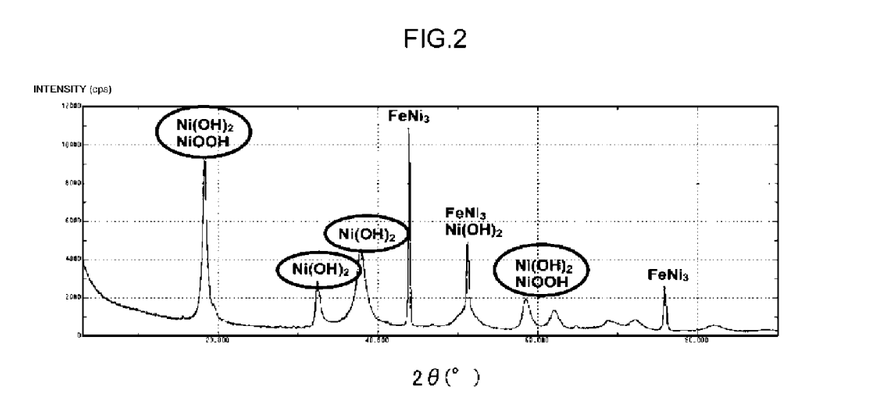
FIG. 2 is a graph showing an X-ray diffraction pattern before degradation.

The nickel hydroxide is typically crystalline nickel hydroxide. The nickel hydroxide being crystalline can be confirmed by an X-ray diffraction pattern obtained by an X-ray powder diffraction method using CuKα rays. In other words, as shown in FIG. 2, when a peak belonging to nickel hydroxide is observed in an X-ray diffraction pattern, the nickel hydroxide may be considered crystalline.

The negative electrode 20 includes a negative electrode current collector and a negative electrode active material layer formed on both surfaces of the negative electrode current collector. The negative electrode current collector has a foil shape. The negative electrode current collector is preferably a nickel foil. The negative electrode active material layer includes a negative electrode active material. The negative electrode active material may be iron hydroxide, zinc oxide, or a hydrogen occlusion alloy. As the hydrogen occlusion alloy, a known alloy used as a negative electrode active material of a nickel hydrogen secondary battery can be used of which examples include an alloy including rare earth and nickel. The negative electrode active material may be hydrated. In addition, for the purpose of improving characteristics of the negative electrode active material or the like, a part of the iron element of iron hydroxide may be replaced by another metallic element (for example, cobalt, tungsten, titanium, niobium, ruthenium, and gold) and a part of the zinc element of zinc oxide may be replaced by another metallic element (for example, cobalt, tungsten, titanium, niobium, ruthenium, and gold).

As the separator 30, a separator used in conventional nickel-hydrogen batteries can be used. For example, a hydrophilized resin material (for example, a sulfonated nonwoven polypropylene fabric) can be used as the separator 30.

In the nickel-hydrogen battery 100, an electrode body including the positive electrode 10, the negative electrode 20, and the separator 30 described above is housed inside the case 40 from an opening of the case 40, and an appropriate electrolyte is arranged (injected) in the case 40. As the electrolyte, an alkaline water-based solution including potassium hydroxide or the like can be used.

Subsequently, the opening of the case 40 is sealed to complete assembly of the nickel-hydrogen battery 100. A sealing process of the case 40 and an arrangement (injection) process of the electrolyte can be performed in a similar manner to methods used when manufacturing a conventional nickel-hydrogen battery and do not characterize the present invention. Construction of the nickel-hydrogen battery 100 is completed in this manner.

Figure 3:
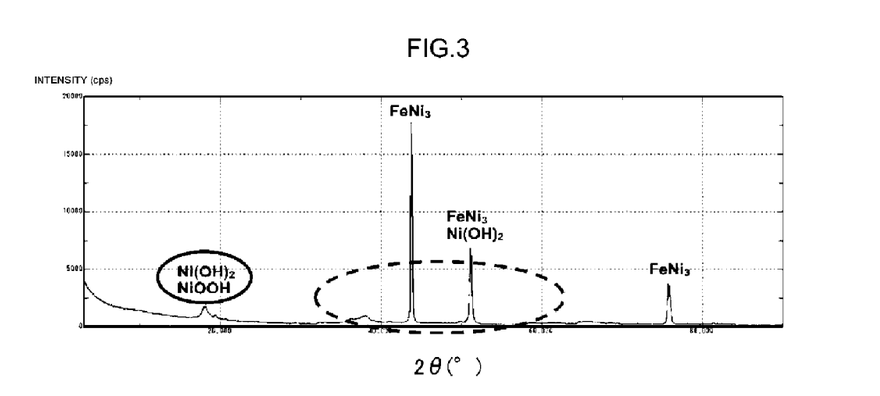
FIG. 3 is a graph showing an X-ray diffraction pattern after degradation.

According to findings of the inventors, with nickel-hydrogen batteries using nickel hydroxide as a positive electrode active material as is in the case of the nickel-hydrogen battery 100, repetitive charging and discharging and long-term disuse may cause crystalline structures of nickel hydroxide and nickel oxyhydroxide included in a positive electrode to collapse and become deactivated (converted into inactive crystals including amorphous). Deactivation of nickel hydroxide and nickel oxyhydroxide can be confirmed when, for example, as shown in FIG. 3, peaks belonging to nickel hydroxide and nickel oxyhydroxide are not observed or observed to decrease in peak intensity in an X-ray diffraction pattern obtained by an X-ray powder diffraction method using CuKα rays. When nickel hydroxide and nickel oxyhydroxide are deactivated in this manner, the electrode also becomes inactive and an electrochemical redox reaction is less likely to occur. As a result, discharge capacity (which refers to chargeable and dischargeable capacity; the same definition will apply hereinafter) may decline.

The technique disclosed herein focuses on capacity degradation due to such deactivation of nickel hydroxide and nickel oxyhydroxide and is designed to promote reactivation (typically, recrystallization) of deactivated nickel hydroxide and nickel oxyhydroxide to recover degraded discharge capacity by applying a pulse current with a specific pulse waveform.

<Regeneration Method>

A feature of the regeneration method of a nickel-hydrogen battery disclosed herein is that a regeneration process of charging a nickel-hydrogen battery is performed by supplying a square-wave pulse current set to a repetition frequency ranging from 5 kHz to 10 kHz and to an average value of current ranging from 1 A to 10 A. By supplying and charging with a pulse current with a specific pulse waveform in this manner, nickel hydroxide and nickel oxyhydroxide having been deactivated due to repetitive charging and discharging and long-term disuse are reactivated (typically, after being temporarily dissolved in the electrolyte, precipitated in a crystalline state) and the discharge capacity of the degraded nickel-hydrogen battery can be promptly recovered.

The regeneration process is performed when a chargeable and dischargeable capacity of a nickel-hydrogen battery drops below an initial capacity (in other words, a chargeable and dischargeable capacity of a new, unused battery) due to repetitive charging and discharging and long-term disuse. Favorably, the regeneration process is performed once the chargeable and dischargeable capacity of the nickel-hydrogen battery drops to 50% or lower (favorably 35% or lower, and more favorably 25% or lower) with respect to the initial capacity.

An average value of a pulse current (hereinafter, also simply described as "$I_{AVE}$") in the regeneration process is appropriately set to approximately 10 A or lower (in other words, $I_{AVE} \leq 10$ A). When the average value of the pulse current $I_{AVE}$ is too high, heat generated by a load of the pulse charging raises battery temperature and causes energy loss. Therefore, progress of reactivation of nickel hydroxide and the like may be retarded and discharge capacity may not be efficiently recovered. From the perspective of efficiently recovering discharge capacity, the average value of the pulse current $I_{AVE}$ is favorably $I_{AVE} \leq 8$ A, more favorably $I_{AVE} \leq 5$ A, and even more favorably $I_{AVE} \leq 3.6$ A. In addition, the average value of the pulse current $I_{AVE}$ may normally be 1 A or higher (in other words, 1 A$\leq I_{AVE}$). When the average value of the pulse current $I_{AVE}$ is within this range, reactivation of deactivated nickel hydroxide and the like can be reliably promoted. Furthermore, since quick charging becomes possible, the regeneration process can be quickly performed. From the perspectives of charging efficiency and the like, the average value of the pulse current is favorably 1.5 A$\leq I_{AVE}$, more favorably 2 A$\leq I_{AVE}$, and even more favorably 2.5 A$\leq I_{AVE}$. The technique disclosed herein may be favorably implemented in an aspect in which the average value of the pulse current $I_{AVE}$ is, for example, 1 A or higher and 10 A or lower (typically, 1 A or higher and 3.6 A or lower).

The repetition frequency of the pulse current (hereinafter, also simply described as "f") is expressed as f=1/T, where T denotes a repetition period of a pulse waveform. The repetition frequency may normally be 5 kHz or higher and 10 kHz or lower (5 kHz$\leq$f$\leq$10 kHz). By setting the repetition frequency of the pulse current to 5 kHz or higher and 10 kHz or lower, reactivation of deactivated nickel hydroxide can be sufficiently promoted and degraded discharge capacity can be reliably recovered. The repetition frequency may be, for example, 6 kHz$\leq$f and, typically, 7 kHz$\leq$f. In addition, the repetition frequency may be, for example, f$\leq$9 kHz and, typically, f$\leq$8 kHz.

An amplitude of the pulse current (hereinafter, also simply described as "$I_{MAX}$") is not particularly limited as long as the average value of the pulse current ($I_{AVE}$) and the repetition frequency (f) satisfy the numerical ranges provided above. Normally, the amplitude of the pulse current is appropriately set to 2 A or higher and, from the perspectives of quick charging (charging efficiency) and the like, the amplitude of the pulse current is favorably 3 A$\leq I_{MAX}$, more favorably 4 A$\leq I_{MAX}$, and even more favorably 5 A$\leq I_{MAX}$. In addition, while an upper limit of the amplitude of the pulse current is not particularly limited, for example, the amplitude of the pulse current is 20 A or lower and, from the perspectives of efficiently recovering discharge capacity and the like, the amplitude of the pulse current is favorably $I_{MAX} \leq 16$ A, more favorably $I_{MAX} \leq 10$ A. and even more favorably $I_{MAX} \leq 7.2$ A. The technique disclosed herein may be favorably implemented in an aspect in which the amplitude of the pulse current is, for example, 2 A or higher and 20 A or lower (typically, 2 A or higher and 7.2 A or lower).

A pulse width of the pulse current (hereinafter, also simply described as "tp") is not particularly limited as long as the average value of the pulse current ($I_{AVE}$) and the repetition frequency (f) satisfy the numerical ranges provided above. For example, the pulse width of the pulse current is appropriately set to $1.6 \times 10^{-4}$ seconds or less and, from the perspectives of efficiently recovering discharge capacity and the like, the pulse width of the pulse current is favorably $1.2 \times 10^{-4}$ seconds or less. For example, the pulse width of the pulse current may be tp$\leq 1 \times 10^{-4}$ seconds and, typically, tp$\leq 8 \times 10^{-5}$ seconds. In addition, while a lower limit of the pulse width of the pulse current is not particularly limited, for example, the pulse width of the pulse current may be $2 \times 10^{-5}$ seconds or more. From the perspectives of charging efficiency and the like, the pulse width is favorably $4 \times 10^{-5}$ seconds$\leq$tp and more favorably $5 \times 10^{-5}$ seconds$\leq$tp. The technique disclosed herein may be favorably implemented in an aspect in which the pulse width of the pulse current is, for example, $2 \times 10^{-5}$ seconds or more and $1.6 \times 10^{-4}$ seconds or less (typically, $5 \times 10^{-5}$ seconds or more and $1 \times 10^{-4}$ seconds or less).

A duty ratio of the pulse current (hereinafter, also simply described as "D") is a ratio between the pulse width tp and the repetition period T (tp/T) The duty ratio is not particularly limited as long as the average value of the pulse current ($I_{AVE}$) and the repetition frequency (f) satisfy the numerical ranges provided above. The duty ratio of the pulse current may be, for example, 80% or lower (in other words, D≤80%). From the perspectives of efficiently recovering discharge capacity and the like, the duty ratio of the pulse current is favorably D≤70% and more favorably D≤60%. In addition, the duty ratio of the pulse current may be, for example, 20% or higher (in other words, 20%≤D). From the perspectives of charging efficiency and the like, the duty ratio is favorably 30%≤D, more favorably 40%≤D, and even more favorably 50%≤D. The technique disclosed herein may be favorably implemented in an aspect in which the duty ratio is, for example, 40% or higher and 60% or lower (typically, 50% or higher and 60% or lower).

In a favorable aspect, in the regeneration process, after discharging the nickel-hydrogen battery until an SOC drops to 50% or lower (for example, 0% to 50%, typically 10% to 50%, favorably 40% or lower, more favorably 30% or lower, and even more favorably 20% or lower), a square-wave pulse current set to a repetition frequency ranging from 5 kHz to 10 kHz and to an average value of current ranging from 1 A to 10 A is supplied to charge the nickel-hydrogen battery until the SOC rises to 90 or higher (for example, 90% to 100%, favorably 95% or higher, and more favorably 100%/o). Charging by supplying a pulse current from a deep discharged state with an SOC of 50% or lower to a state near full charge with an SOC of 90% or higher in this manner, regeneration of nickel hydroxide and the like may be further promoted and the capacity recovery effect described above may be better exhibited.

In addition, the number of times the charging process using a pulse current is performed in the regeneration process is not limited to once and the charging process may be repeated a plurality of times. In a favorable aspect, in the regeneration process, a charging-discharging cycle of discharging the nickel-hydrogen battery until the SOC drops to 50% or lower and subsequently supplying a square-wave pulse current set to a repetition frequency ranging from 5 kHz to 10 kHz and to an average value of current ranging from 1 A to 10 A to charge the nickel-hydrogen battery until the SOC rises to 90% or higher is repeated at least twice (for example, 2 to 10 times, typically 2 to 5 times, and favorably 2 to 3 times). Such a repeatedly-performed pulse charging process enables degraded discharge capacity to be reliably recovered even in the case of batteries in which sufficient capacity recovery is not obtained by one pulse charging.

The regeneration process in the regeneration method disclosed herein is favorably executed while cooling the nickel-hydrogen battery using a cooling mechanism. The cooling mechanism is not particularly limited as long as the nickel-hydrogen battery may be brought into contact with a coolant (for example, air or cooling water) and cooled. For example, the cooling mechanism may be a fan which sends air toward the nickel-hydrogen battery. When a load of pulse charging raises battery temperature and causes energy loss, progress of reactivation of nickel hydroxide may be retarded and degraded discharge capacity may not be efficiently recovered. In such a case, a quiescent period in which pulse charging is suspended during the regeneration process must be provided and the pulse charging must be restarted after lowering the battery temperature (for example, to 60° C. or lower). In contrast, according to the configuration described above, by performing pulse charging while cooling the nickel-hydrogen battery using a cooling mechanism, a rise in the battery temperature can be suppressed (for example, to 60° C. or lower). Therefore, there is no need to provide a quiescent period for lowering the battery temperature and a regeneration process time can be reduced.

A method of supplying a pulse current to the nickel-hydrogen battery in the regeneration process is not particularly limited. The regeneration process can be performed using a pulse current circuit (rest switch) constituted by a semiconductor element for electric power such as an insulated-gate bipolar transistor (IGBT), a gate turn-off thyristor (GTO), a static induction transistor (SIT), and a field-effect transistor (FET). For example, by using an IGBT to convert a charge current from an external direct current power supply into a square-wave charge current in which ON and OFF are alternately repeated, a pulse current set to a repetition frequency ranging from 5 kHz to 10 kHz and to an average value of current ranging from 1 A to 10 A can be generated. According to this configuration, the regeneration process described above can be executed by a simple configuration of incorporating a semiconductor element such as an IGBT into a charge circuit. Therefore, compared to conventional examples, an apparatus configuration can be simplified and costs incurred by the regeneration process can be reduced.

(Second Embodiment)

Figure 6:
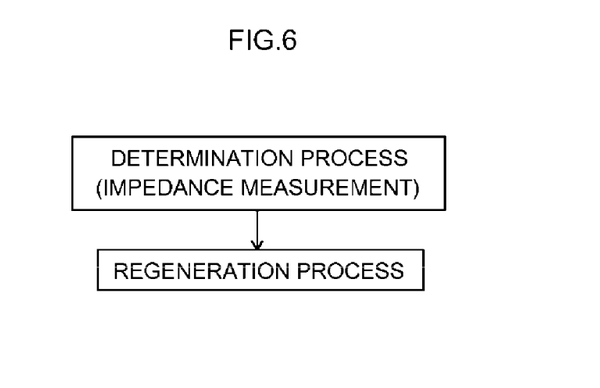
FIG. 6 is a diagram showing a process flow of a regeneration method according to another embodiment.

As shown in FIG. 6, a regeneration method according to the present embodiment is configured so that, before performing a regeneration process, a determination process is performed in which an impedance of a nickel-hydrogen battery that is a processing object is measured and whether or not the nickel-hydrogen battery is regenerable is determined based on a result of the impedance measurement.

In the impedance measurement, for example, an alternating current signal (typically, an alternating current or an alternating current voltage) is applied to the battery while changing frequencies within a range of 1050 Hz to 0.1 Hz and an impedance is measured from a voltage/current response signal. In doing so, a plurality of impedances are obtained due to the differences in frequencies. Based on the plurality of impedances, a call-call plot can be obtained by plotting resistance R (Ω) which is a real part of a complex impedance on a horizontal axis X of plane coordinates and plotting inductance X (Ω) which is an imaginary part of the complex impedance on a vertical axis Y of the plane coordinates. In the call-call plot, plots obtained when applying a high-frequency signal are plotted to lower values of the inductance X. In addition, plots obtained when applying a low-frequency signal are plotted to higher values of the inductance X.

Figure 7:
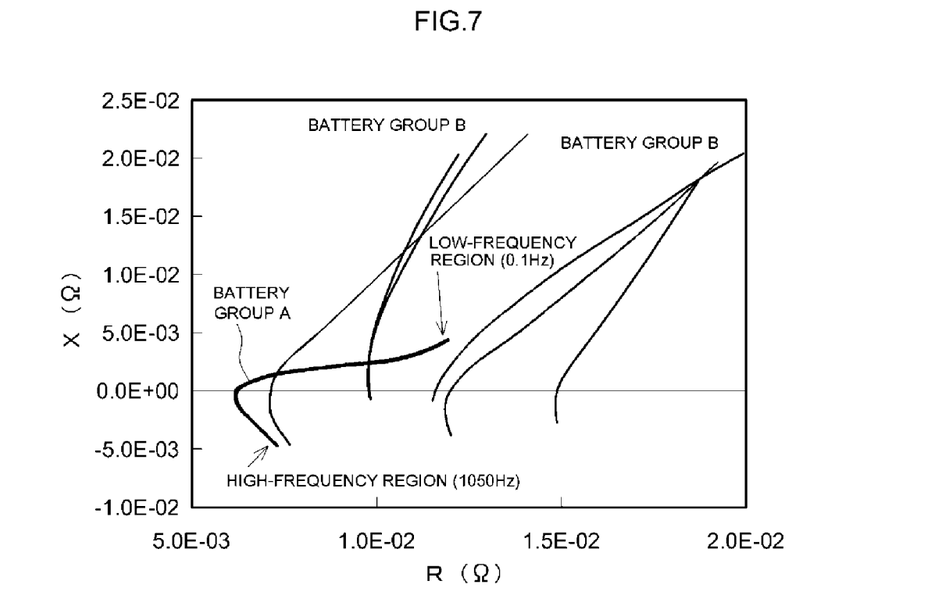
FIG. 7 is a diagram showing a call-call plot of a battery before a regeneration process.

In consideration thereof, as a result of performing various experiments, the present inventors found that whether or not a battery is regenerable by the regeneration process using a pulse current described earlier can be determined based on a result of an impedance measurement. Specifically, a cycle degradation test was performed by preparing a plurality of nickel-hydrogen batteries having a same initial capacity (rated capacity) and, on each battery, repeating charging-discharging cycles until discharge capacity degraded to 50% or lower of the initial capacity (capacity when new). Next, on each of the degraded batteries, an impedance measurement was performed by applying an alternating current signal while changing frequencies within a range of 1050 Hz to 0.1 Hz. After the impedance measurement, a regeneration process was performed by discharging each battery until an SOC dropped to 0% and subsequently supplying a square-wave pulse current to charge the battery until the SOC reached 100%. As pulse current conditions, a repetition frequency was set to 10 kHz, an average value of current was set to 3 A, and a duty ratio was set to 50%. Subsequently, the discharge capacity (post-regeneration capacity) of each battery after the regeneration process was measured. FIG. 7 shows a result of the impedance measurement of, among the measured batteries, a battery group A of which the post-regeneration capacity recovered to 70% or more of the initial capacity and a battery group B of which the post-regeneration capacity was less than 70% of the initial capacity.

As shown in FIG. 7, the inductance values of impedances obtained when a high-frequency signal (for example, 1050 Hz) was applied were not very different between the battery groups A and B. On the other hand, the inductance values of impedances obtained when a low-frequency signal (for example, 0.1 Hz) was applied differed significantly between the battery groups A and B. Specifically, the inductance values of impedances obtained when a low-frequency signal was applied dropped significantly for the battery group A of which the post-regeneration capacity recovered to 70% or more of the initial capacity as compared to the battery group B. This suggests that, with a battery with a low inductance value of an impedance obtained when a low-frequency signal was applied, the regeneration process using a pulse current is effective. In other words, by using the inductance value obtained by the impedance measurement, whether or not the battery is regenerable can be determined.

Moreover, while reasons for the occurrence of such differences should not be particularly narrowly interpreted, for example, a conceivable reason is as follows. Specifically, according to findings of the present inventors, an inductance value of an impedance obtained when a high-frequency signal is applied is attributable to liquid resistance of an electrolyte. On the other hand, an inductance value of an impedance obtained when a low-frequency signal is applied is attributable to reaction resistance of an electrode. With a battery of which the inductance value of an impedance obtained when a low-frequency signal is applied, reaction resistance of a positive electrode is large and nickel hydroxide in the positive electrode is less likely to be activated. Therefore, once nickel hydroxide becomes deactivated due to repetitive charging and discharging and long-term disuse, reactivation is difficult even when a regeneration process using a pulse current is performed. In other words, discharge capacity is less likely to recover. In contrast, with a battery of which the inductance value of an impedance obtained when a low-frequency signal is applied, reaction resistance of a positive electrode is small and nickel hydroxide in the positive electrode is more likely to become activated. Therefore, even when nickel hydroxide becomes temporarily deactivated, reactivation is readily performed by a regeneration process using a pulse current. In other words, a regeneration process using a pulse current is conceivably effective.

In consideration of the findings described above, in the regeneration method according to the present embodiment, before performing the regeneration process, a determination process is performed in which an impedance of a nickel-hydrogen battery that is a processing object is measured at a prescribed frequency and, by comparing an inductance value of the measured impedance with a threshold A set in advance, whether or not the nickel-hydrogen battery is regenerable is determined.

A measurement frequency in the impedance measurement is, for example, appropriately set to 10 Hz or lower, favorably 1 Hz or lower, and more favorably 0.1 Hz or lower. By using an inductance value of an impedance measured in such a low-frequency region, the determination process can be performed with high accuracy. While a lower limit of the measurement frequency is not particularly limited, for example, the measurement frequency may be 0.001 Hz or higher.

While the inductance threshold A which is used as a determination criterion may differ also depending on the measurement frequency, for example, when the measurement frequency is 0.1 Hz, the graph shown in FIG. 7 shows that the threshold A is favorably set to $5 \times 10^{-3} \Omega$. In this case, the battery may be determined as regenerable when the inductance value of the impedance measured at 0.1 Hz is $5 \times 10^{-3} \Omega$ or lower and the battery may be determined as not regenerable when the inductance value is higher than $5 \times 10^{-3} \Omega$. In addition, the regeneration process using a pulse current may be performed only on batteries determined as regenerable in the determination process. Accordingly, batteries of which capacity cannot be recovered by a pulse current can be eliminated in advance and the cost incurred by a subsequent regeneration process and the like can be reduced.

While several test examples related to the present invention will be described below, it is to be understood that the following test examples are not intended to limit the present invention to contents thereof.

TEXT EXAMPLE 1

<Construction of Nickel-hydrogen Batteries>

A nickel-hydrogen battery (test cell) configured such that positive and negative electrodes in which a positive electrode active material layer and a negative electrode active material layer are respectively retained by a positive electrode current collector and a negative electrode current collector are laminated via a separator and housed in a case with an electrolyte was constructed in plurality.

A paste for forming the positive electrode active material layer was prepared by mixing nickel hydroxide powder as the positive electrode active material and other components of the positive electrode active material layer in a solution. The paste for forming the positive electrode active material layer was applied on the positive electrode current collector and dried to fabricate a positive electrode in which the positive electrode active material layer is provided on the positive electrode current collector.

A paste for the negative electrode active material layer was prepared by mixing a hydrogen occlusion alloy as the negative electrode active material and other components of the negative electrode active material layer in a solution. The paste for the negative electrode active material layer was applied on the negative electrode current collector (a nickel foil was used) and dried to fabricate a negative electrode in which the negative electrode active material layer is provided on the negative electrode current collector.

The fabricated positive electrode and negative electrode were laminated via a separator, the obtained laminate was housed in a case together with an electrolyte, and an opening of the case was air-tightly sealed. A sulfonated nonwoven polypropylene fabric was used as the separator. A potassium hydroxide water-based solution was used as the electrolyte. The nickel-hydrogen batteries were assembled in this manner. Subsequently, an initial charging and discharging process (conditioning) was performed according to a conventional method to obtain test cells.

<Measurement of Initial Capacity>

After charging the test cells constructed as described above at a constant current with a current value of 3.0 A up to an SOC of 100%, the test cells were discharged at a constant current with a current value of 2.6 A down to a discharge lower limit voltage of 6.0 V, and a discharge capacity measured during the discharge was adopted as an initial capacity (rated capacity).

<Cycle Degradation Test>

After the measurement of the initial capacity, a cycle degradation test was performed on the plurality of test cells. In the cycle degradation text, with one cycle being a charging-discharging cycle of charging up to an SOC of 80% at 2.0 to 3.0 A and subsequently discharging down to an SOC of 20% at 2.0 to 3.0 A, the charging-discharging cycle was repeated until discharge capacity degraded on average to 50% of the initial capacity or less. The discharge capacity after degradation was measured by the same procedure as that in <Measurement of initial capacity> described above. In this manner, a plurality of test cells with degraded discharge capacity were prepared.

<Regeneration Process>

A regeneration process using a pulse current was performed on the cells after the cycle degradation test. Specifically, a regeneration process was performed by discharging each cell until the SOC dropped to 0% and subsequently supplying a square-wave pulse current to charge the cell until the SOC reached 100%. Pulse current conditions applied in the regeneration process are collectively shown in Table 1. An average value of current was set to 1 A in Example 1, 3 A in Examples 2 and 5 to 8, 10 A in Example 3, and 20 A in Example 4. A repetition frequency was set to 10 kHz in Examples 1 to 4 and 6 to 8 and to 5 kHz in Example 5. A duty ratio was set to 50% in Examples 1 to 5, 20% in Example 6, 30% in Example 7, and 60% in Example 8. In this case, 10 test cells were submitted for each of the Examples 1 to 8 to perform the regeneration process. Subsequently, the discharge capacity (post-regeneration capacity) after the regeneration process was measured by the same procedure as that in <Measurement of initial capacity> described earlier. Results thereof are shown in corresponding fields in Table 1. In this case, the post-regeneration capacity represents an average value of post-regeneration capacities of the 10 test cells submitted in each example and is indicated by a relative value when the initial capacity is assumed to be 100%.

TABLE 1

| | Pulse current conditions | | | Average value |
| | Average value of current (A) | Repetition frequency (kHz) | Duty ratio (%) | Number of processes performed | (10 cells) of post-regeneration capacity (%) |
| --- | --- | --- | --- | --- | --- |
| Example 1 | 1 | 10 | 50 | 1 | 65.3 |
| Example 2 | 3 | 10 | 50 | 1 | 78.9 |
| Example 3 | 10 | 10 | 50 | 1 | 60.1 |
| Example 4 | 20 | 10 | 50 | 1 | 51.2 |
| Example 5 | 3 | 5 | 50 | 1 | 78.4 |
| Example 6 | 3 | 10 | 20 | 1 | 71.7 |
| Example 7 | 3 | 10 | 30 | 1 | 72 |
| Example 8 | 3 | 10 | 60 | 1 | 70.8 |

As shown in Table 1, Examples 1 to 3 and 5 to 8 subjected to regeneration processes under conditions in which the repetition frequency of the pulse current was 5 kHz to 10 kHz and the average value of the pulse current was 1 A to 10 A produced more favorable results in terms of post-regeneration capacity than Example 4. From this result, it was confirmed that, by performing a regeneration process of charging by supplying a pulse current set to a repetition frequency ranging from 5 kHz to 10 kHz and to an average value of current ranging from 1 A to 10 A, a degraded capacity of a nickel-hydrogen battery can be recovered. In addition, post-regeneration capacities further improved for Examples 1, 2, and 5 to 8 subjected to regeneration processes under conditions in which the average value of the pulse current was 1 A to 3 A as compared to Example 3.

<Measurement of X-ray Diffraction Pattern>

Figure 4:
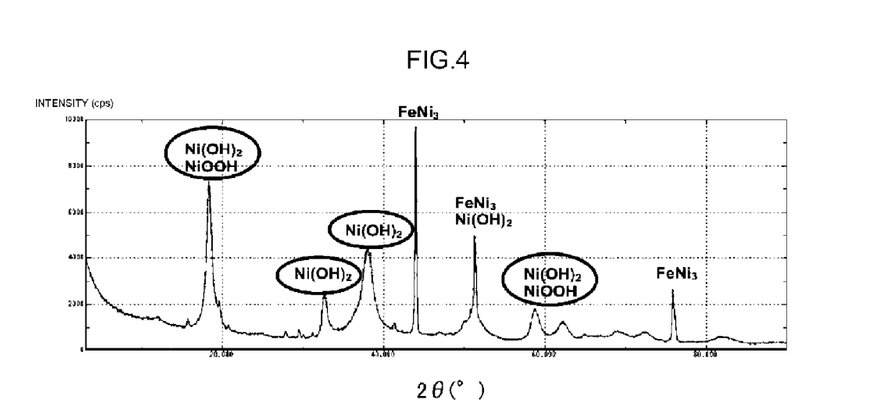
FIG. 4 is a graph showing an X-ray diffraction pattern after a regeneration process.
Figure 5:
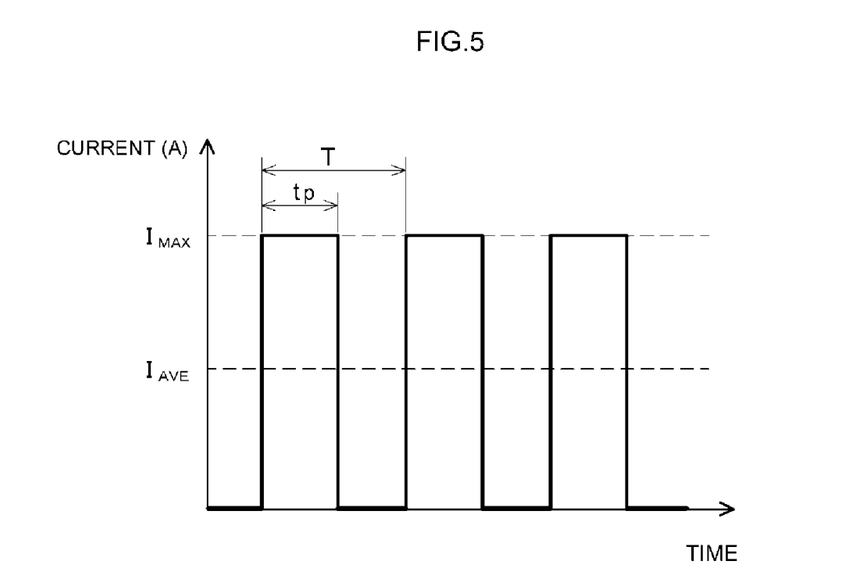
FIG. 5 is graph showing a waveform of a pulse current.

The test cells used in Example 2 were disassembled before and after the cycle degradation test and after the regeneration process and the positive electrode active material was collected. Subsequently, an X-ray diffraction pattern of the collected positive electrode active material was measured. Results thereof are shown in FIGS. 2 to 4. FIG. 2 is a graph showing an X-ray diffraction pattern before the cycle degradation test, FIG. 3 is a graph showing an X-ray diffraction pattern after the cycle degradation test, and FIG. 4 is a graph showing an X-ray diffraction pattern after the regeneration process.

As shown in FIG. 2, in the X-ray diffraction pattern before the cycle degradation test, peaks belonging to nickel hydroxide and nickel oxyhydroxide are observed. Accordingly, the nickel hydroxide and the nickel oxyhydroxide are determined to be crystalline. On the other hand, as shown in FIG. 3, in the X-ray diffraction pattern after the cycle degradation test, peaks belonging to nickel hydroxide and nickel oxyhydroxide have almost entirely disappeared. This is conceivably because crystalline structures of nickel hydroxide and nickel oxyhydroxide had broken due to repeated charging and discharging in the cycle degradation test and deactivation (deactivation including amorphous) had progressed. On the other hand, as shown in FIG. 4, in the X-ray diffraction pattern after the regeneration process, peaks belonging to nickel hydroxide and nickel oxyhydroxide are observed once again. From this result, it was confirmed that, due to the regeneration process using a pulse current, deactivated nickel hydroxide and nickel oxyhydroxide are reactivated (typically, recrystallized).

Furthermore, the following test was performed in order to confirm an effect of the repeatedly-performed pulse charging process on post-regeneration capacity.

TEXT EXAMPLE 2

Figure 8:
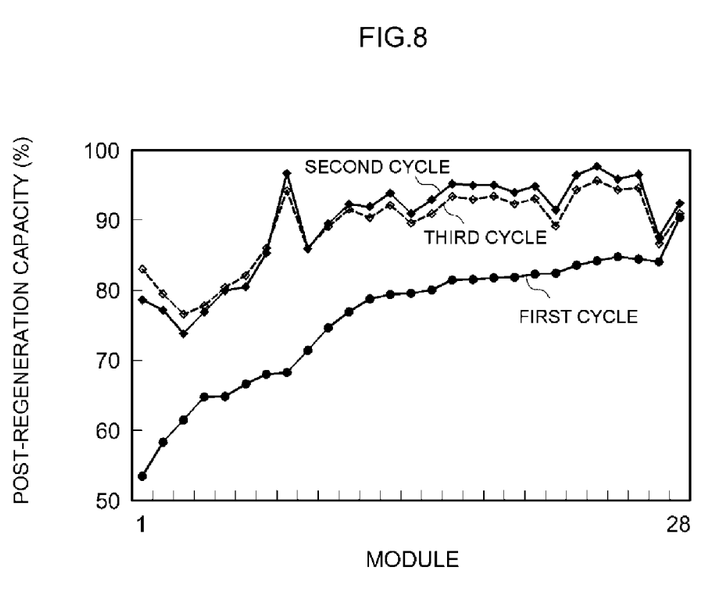
FIG. 8 is a graph showing a transition of post-regeneration capacity after each cycle.

In the present example, a regeneration process of repeatedly performing a pulse charging process on test cells after the cycle degradation test was performed. In this case, 27 test cells were subjected to the regeneration process. Specifically, a regeneration process was performed in which a charging-discharging cycle of discharging each test cell until an SOC dropped to 0% and subsequently supplying a square-wave pulse current set to a repetition frequency of 10 kHz, an average value of current of 3 A. and a duty ratio of 50% to charge the cell until the SOC reached 100% was repeated three times. Subsequently, the discharge capacity (post-regeneration capacity) after each cycle was measured by the same procedure as that in <Measurement of initial capacity> described earlier. Results thereof are shown in FIG. 8. FIG. 8 is a graph showing a transition of discharge capacity (post-regeneration capacity) after each cycle. In this case, the post-regeneration capacity is indicated by a relative value when the initial capacity is assumed to be 100%.

As is apparent from FIG. 8, even with batteries for which sufficient capacity recovery was not obtained by the pulse charging process of a first cycle, discharge capacity recovered by the repeatedly-performed pulse charging process. From this result, it was confirmed that the repeatedly-performed pulse charging process enables degraded battery performance to be more reliably recovered.

While specific examples of the present invention have been described in detail, such specific examples are merely illustrative and are not intended to limit the scope of claims. Techniques described in the scope of claims include various modifications and changes made to the specific examples illustrated above.

What is claimed is:

1. A regeneration method of a nickel-hydrogen battery having degraded battery performance due to repetitive charging and discharging and/or long-term disuse, the nickel-hydrogen battery provided with a positive electrode at least including nickel hydroxide, the regeneration method comprising:

performing a regeneration process of charging the nickel-hydrogen battery by supplying only a square-wave pulse current set to a repetition frequency ranging from 5 kHz to 10 kHz and to an average value of current ranging from 1 A to 10 A to recover the battery performance having been degraded.

2. The regeneration method according to claim 1, wherein in the regeneration process, after discharging the nickel-hydrogen battery until an SOC drops to 50% or lower, the pulse current is supplied to charge the nickel-hydrogen battery until the SOC rises to 90% or higher.

3. The regeneration method according to claim 1, wherein in the regeneration process, a charging-discharging cycle of discharging the nickel-hydrogen battery until the SOC drops to 50% or lower and then supplying the pulse current to charge the nickel-hydrogen battery until the SOC rises to 90% or higher is repeated at least twice.

4. The regeneration method according to claim 1, wherein the regeneration process is performed while cooling the nickel-hydrogen battery using a cooling mechanism.

5. The regeneration method according to claim 1, wherein before performing the regeneration process, a determination process is performed in which an impedance of a nickel-hydrogen battery that is a processing object is measured at a prescribed frequency and, by comparing an inductance value of the measured impedance with a threshold A set in advance, whether or not the nickel-hydrogen battery is regenerable is determined.

* * * * *